US011658738B2

(12) United States Patent
Sugiyama

(10) Patent No.: US 11,658,738 B2
(45) Date of Patent: May 23, 2023

(54) OPTICAL DEVICE, OPTICAL MODULE USING THE SAME, AND OPTICAL DEVICE TESTING METHOD

(71) Applicant: Fujitsu Optical Components Limited, Kawasaki (JP)

(72) Inventor: Masaki Sugiyama, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 1041 days.

(21) Appl. No.: 16/415,343

(22) Filed: May 17, 2019

(65) Prior Publication Data
US 2019/0372664 A1  Dec. 5, 2019

(30) Foreign Application Priority Data

May 31, 2018  (JP) .............................. JP2018-105357

(51) Int. Cl.
| H04B 10/071 | (2013.01) |
| G02B 6/12 | (2006.01) |
| H04B 10/40 | (2013.01) |
| G01M 11/00 | (2006.01) |

(52) U.S. Cl.
CPC ........... *H04B 10/071* (2013.01); *G01M 11/00* (2013.01); *G01M 11/30* (2013.01); *G01M 11/33* (2013.01); *G02B 6/12004* (2013.01); *G02B 6/12007* (2013.01); *H04B 10/40* (2013.01); *G02B 2006/12107* (2013.01); *G02B 2006/12166* (2013.01)

(58) Field of Classification Search
CPC .................................................. H04B 10/071
See application file for complete search history.

(56) References Cited

U.S. PATENT DOCUMENTS

| 2004/0208579 A1 | 10/2004 | Bendett et al. |
| 2012/0104389 A1 | 5/2012 | Whitbread et al. |
| 2014/0126601 A1 | 5/2014 | Jeong |
| 2015/0147024 A1 | 5/2015 | Whitbread et al. |
| 2015/0247779 A1 | 9/2015 | Okamoto |

(Continued)

FOREIGN PATENT DOCUMENTS

| CN | 101097274 A | 1/2008 |
| CN | 102449456 | 5/2012 |
| CN | 103718398 A | 4/2014 |

(Continued)

OTHER PUBLICATIONS

Patent Abstracts of Japan English abstract for Japanese Patent Publication No. 2011-107384, published Jun. 2, 2011.

(Continued)

*Primary Examiner* — Joseph L Williams
(74) *Attorney, Agent, or Firm* — Staas & Halsey LLP

(57) ABSTRACT

An optical device with an optical transmitter circuit and an optical receiver circuit integrated on a substrate has at least one of a first oblique waveguide extending obliquely with respect to an edge of the substrate at or near an incident port for introducing a light emitted from a light source to the optical device, a second oblique waveguide extending obliquely with respect to the edge of the substrate at or near a signal receiving port optically connected to the optical receiver circuit, and a third oblique waveguide extending obliquely with respect to the edge of the substrate at or near a signal transmission port optically connected to the optical transmitter circuit.

9 Claims, 12 Drawing Sheets

(56) References Cited

U.S. PATENT DOCUMENTS

| | | | |
|---|---|---|---|
| 2017/0082799 | A1 | 3/2017 | Novack et al. |
| 2018/0198483 | A1 | 7/2018 | Kikuchi et al. |

FOREIGN PATENT DOCUMENTS

| | | |
|---|---|---|
| JP | 5-27130 | 2/1993 |
| JP | 2011-107384 | 6/2011 |
| JP | 2012-523014 | 9/2012 |
| JP | 2017-98362 | 6/2017 |
| WO | WO 2014/034238 A1 | 3/2014 |
| WO | WO2017/017955 | 2/2017 |

OTHER PUBLICATIONS

Office Action, dated May 10, 2022, in Japanese Patent Application No. 2018-105357 (5 pp.).
First Notification of Office Action, dated Apr. 27, 2020, in Chinese Application No. 201910444729.0 (19 pp.).
Office Action, dated Dec. 15, 2020, in corresponding Chinese Application No. 201910444729.0 (13 pp.).
Office Action, dated Oct. 9, 2021, in corresponding Chinese Patent Application No. 201910444729.0 (15 pp.).
Office Action, dated Apr. 13, 2021, in corresponding Chinese Patent Application No. 201910444729.0 (19 pp.).
Notice of Reasons for Refusal, dated Dec. 7, 2021, in corresponding Japanese Patent Application No. 2018-105357 (10 pp.).

OPTICAL DEVICE, OPTICAL MODULE USING THE SAME, AND OPTICAL DEVICE TESTING METHOD

CROSS-REFERENCE TO RELATED APPLICATIONS

This application is based upon and claims priority to earlier filed Japanese Patent Application No. 2018-105357 filed May 31, 2018, which is incorporated herein by reference in its entirety.

FIELD

The present invention relates to an optical device for optical communication, an optical module using such an optical device, and an optical device testing method.

BACKGROUND

Due to global spread of information and telecommunication devices such as smartphones and progress in the Internet of Things (IoT), demand for high-capacity optical transmission technology is increasing. While transmission capacity is being increased by wavelength division multiplexing (WDM) schemes, downsizing of optical transceivers are demanded.

Silicon photonics technology is a promising technology for downsizing optical transceivers. Optical elements such as an optical modulator, a polarization rotator (PR), a polarization beam splitter (PBS), or a 90-degree hybrid optical mixer are monolithically integrated on a silicon chip, and a laser diode (LD) is flip-chip mounted on the chip. Other optical elements such as a variable optical attenuator (VOA) or monitor photodiode (PD) for controlling the VOA may also be integrated on the chip. These optical elements are connected by silicon photonic waveguides.

With various functions (including electrical to optical conversion and optical to electrical conversion) for transmitting and receiving optical signals integrated on a chip, the throughputs of the respective performance features are accumulated, and the production yield of the entire chip is likely to decrease. Therefore, it becomes important to distinguish non-defective products through the chip test, and improvement of the test efficiency is desired.

The size of an individual photonic IC chip fabricated with silicon photonics technology is small, and a number of chips are mass produced on a large wafer such as a 300 mm diameter wafer. By performing the test on a wafer before dicing the wafer into chips, the testing process becomes more efficient and reduction in the yield of the product can be avoided. In order to input and output a test light to and from the wafer-state chip areas, grating couplers are provided in each of the chip areas over the wafer. See, for example, patent documents 1 to 3 listed below.

Since the grating coupler produces a large quantity of reflected return light, when there is a reflection point somewhere on the transmission path or the reception path, the light resonates between the reflection point and the grating coupler. Such undesirable resonance may cause noise to be mixed in output light from the transmitter or electrical signal detected at the receiver during actual service.

It is desired to provide a configuration capable of testing an optical device in the wafer state and suppressing deterioration of output signals during actual service.

PRIOR ART DOCUMENT LIST

Patent Document 1: Japanese Patent Application Laid-open No. 2011-107384

Patent Document 2: US Patent Application Publication No. 2017/082799

Patent Document 3: WO 2014/034238

SUMMARY

According to one aspect of the invention, an optical device with an optical transmitter circuit and an optical receiver circuit integrated on a substrate has at least one of a first oblique waveguide extending obliquely with respect to an edge of the substrate at or near an incident port for introducing a light emitted from a light source to the optical device, a second oblique waveguide extending obliquely with respect to the edge of the substrate at or near a signal receiving port optically connected to the optical receiver circuit, and a third oblique waveguide extending obliquely with respect to the edge of the substrate at or near a signal transmission port optically connected to the optical transmitter circuit.

The object and advantages of the invention will be realized and attained by means of the elements and combinations particularly pointed out in the claims. It is to be understood that both the foregoing general description and the following detailed description are exemplary and explanatory and are not restrictive to the invention as claimed.

DESCRIPTION OF EMBODIMENTS

Embodiments provide configurations of an optical device that enables wafer-level testing of performance characteristics of photonic integrated circuit (IC) chips and prevents the output signal from degrading during actual service.

When propagating light resonates between a reflection point on a transmission or reception path and the grating coupler for wafer-level testing, the resonance becomes noise and a transmitter's output light or electrical signals output from the receiver will be degraded.

In order to prevent undesirable light resonance, the following solution may be employed in the embodiments:
(a) providing a grating coupler (or optical coupler) for wafer-level testing in some area other than the chip area on the wafer, or
(b) using a grating coupler formed in a chip area when testing optical performances of another chip area.

With solution (a), the grating coupler used for wafer-level testing does not remain on the chip after the wafer is diced into individual chips. With solution (b), the grating coupler used for wafer-level testing remains on the chip even after dicing, but is optically isolated from actually used transmission/reception path. Either solution can reduce undesirable resonance between the grating coupler and a reflection point on the transmission/reception path during service.

Moreover, in the embodiment, an optical waveguide used to couple the grating coupler for wafer-level testing to the optical circuit in the chip area extends obliquely with respect to the edge of the chip. If the optical waveguide used for the wafer-level testing extends perpendicularly to the edge of the chip, another reflection may occur at an edge or an end face of the chip, even though resonance between a reflection point on the transmission or reception path and the grating coupler for wafer-level testing is prevented. To avoid such extra reflection, the optical waveguide used for the wafer-level testing is provided so as to extend obliquely with respect to the edge of the chip.

This configuration can minimize undesired resonance during service and suppress degradation of optical signals output from the transmitter side and/or degradation of electrical signals output from the receiver side.

Configurations of the optical device are described more particularly below, with reference to the drawings.

First Embodiment

Figure 1:
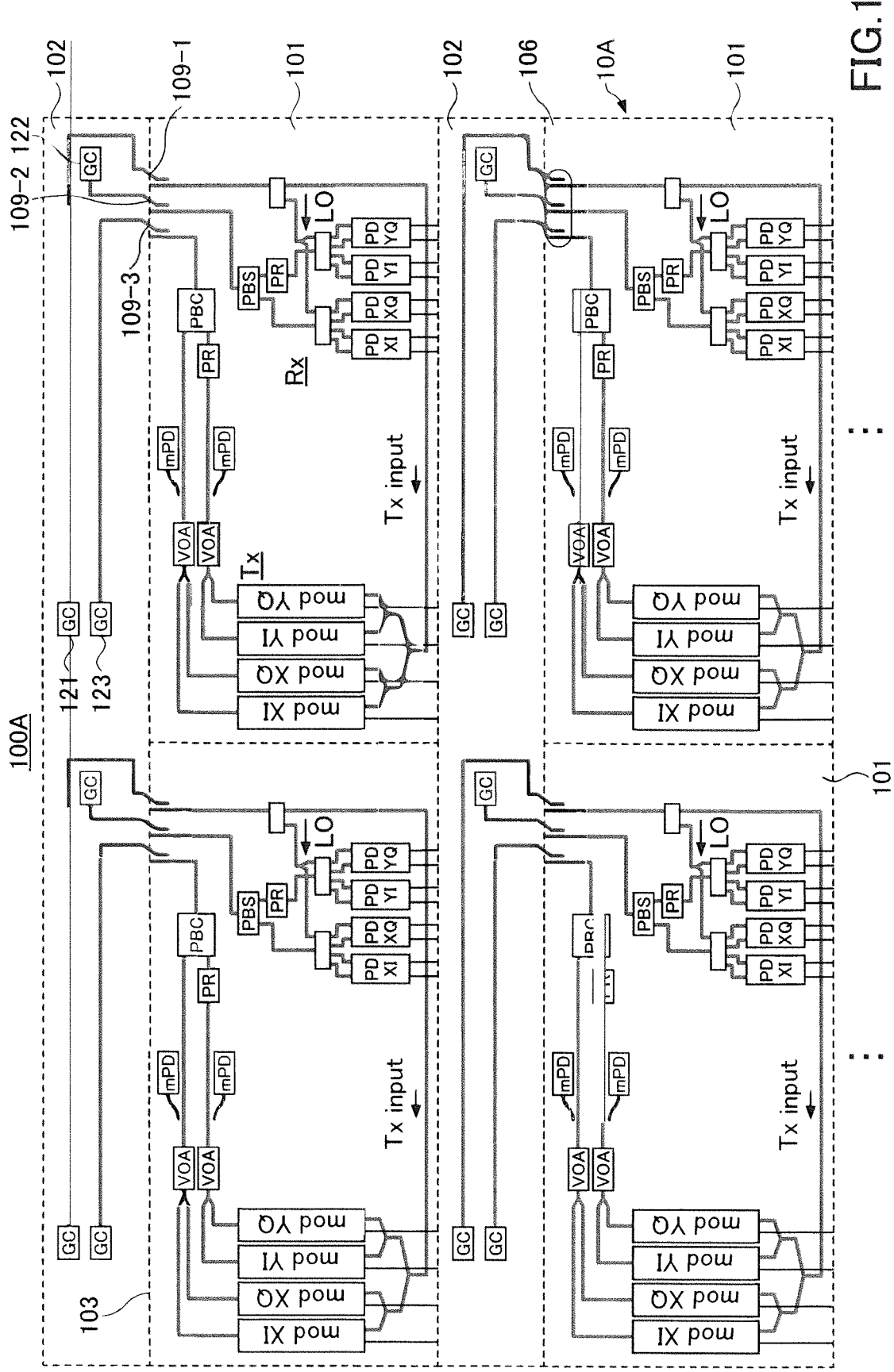
FIG. 1 is a schematic diagram illustrating a plurality of chip areas formed over a wafer according to the first embodiment.

FIG. 1 is a schematic diagram of chip areas 101 formed over a wafer 100A. In the first embodiment, a grating coupler (labeled as "GC" in the figure) for introducing or extracting a test light to or from the chip area 101 is provided outside the chip area 101.

The wafer 100A has chip areas 101 and a test light input/output area 102 adjacent to the chip areas 101. The test light input/output area 102 may be an expanded area of at least a part of a scribe line typically provided on a semiconductor wafer.

A plurality of chip areas 101 are formed over the wafer 100A. A scribe line 103 defines a boundary between adjacent chip areas 101 and a boundary between a chip area 101 and the test light input/output area 102. The wafer 100A is eventually cut along the scribe lines 103 and a large number of optical devices 10A are produced.

In each chip area 101, an optical transmitter circuit Tx and an optical receiver circuit Rx are monolithically formed. Grating couplers 121, 122 and 123 are formed in the test light input/output area 102 in order to introduce a test light in the associated chip area 101 to evaluate optical and electro-optical performances of the chip over wafer 100A.

The grating couplers 121, 122, and 123 are optically coupled to the optical transceiver circuit Tx and the optical receiver circuit Rx of the chip area 101 by oblique waveguides 109-1, 109-2, and 109-3 (which may be collectively referred to as "oblique waveguides 109" as appropriate) extending obliquely with respect to the scribe line 103. The oblique waveguides 109-1 to 109-3 come across the scribe line 103, while maintaining the oblique lines, and enter the peripheral region of the chip area 101. In the peripheral region, the oblique waveguides 109-1 to 109-3 are optically coupled to optical waveguides of the chip area 101. The end parts of the oblique waveguides 109 and the associated optical waveguides of the chip area 101 form directional couplers 106.

When carrying out wafer-level testing, a probe is brought into contact with a probe pad (not illustrated) formed in the chip area 101 to input and output an electrical signal, and simultaneously, test light is supplied to and taken out from the optical circuits of the chip area 101 using optical fibers located above the surface of the wafer 100A. The grating couplers 121 to 123 serve as interfaces for inputting and outputting the test light between the optical fibers and the optical circuits. The end faces of the optical fibers are brought close to the grating couplers 121 to 123 above the surface of the wafer 100A to input and extract the test light.

In the configuration example of FIG. 1, the grating coupler 121 is an interface for inputting a light (such as laser light) emitted from a light source to the optical transmitter circuit Tx. A part of the laser light is supplied to the optical receiver circuit Rx and used as a local light to detect a received light signal. The grating coupler 122 is an interface for inputting a signal light into the optical receiver circuit Rx to monitor the receiving characteristic. The grating coupler 123 is an interface for extracting an optical signal output from the optical transceiver circuit Tx to monitor the characteristics of the optical signal to be transmitted.

Upon completion of the wafer-level testing for the respective chip areas 101, the wafer 100A is cut or diced along the scribe lines 103 and divided into individual chips.

Figure 2:
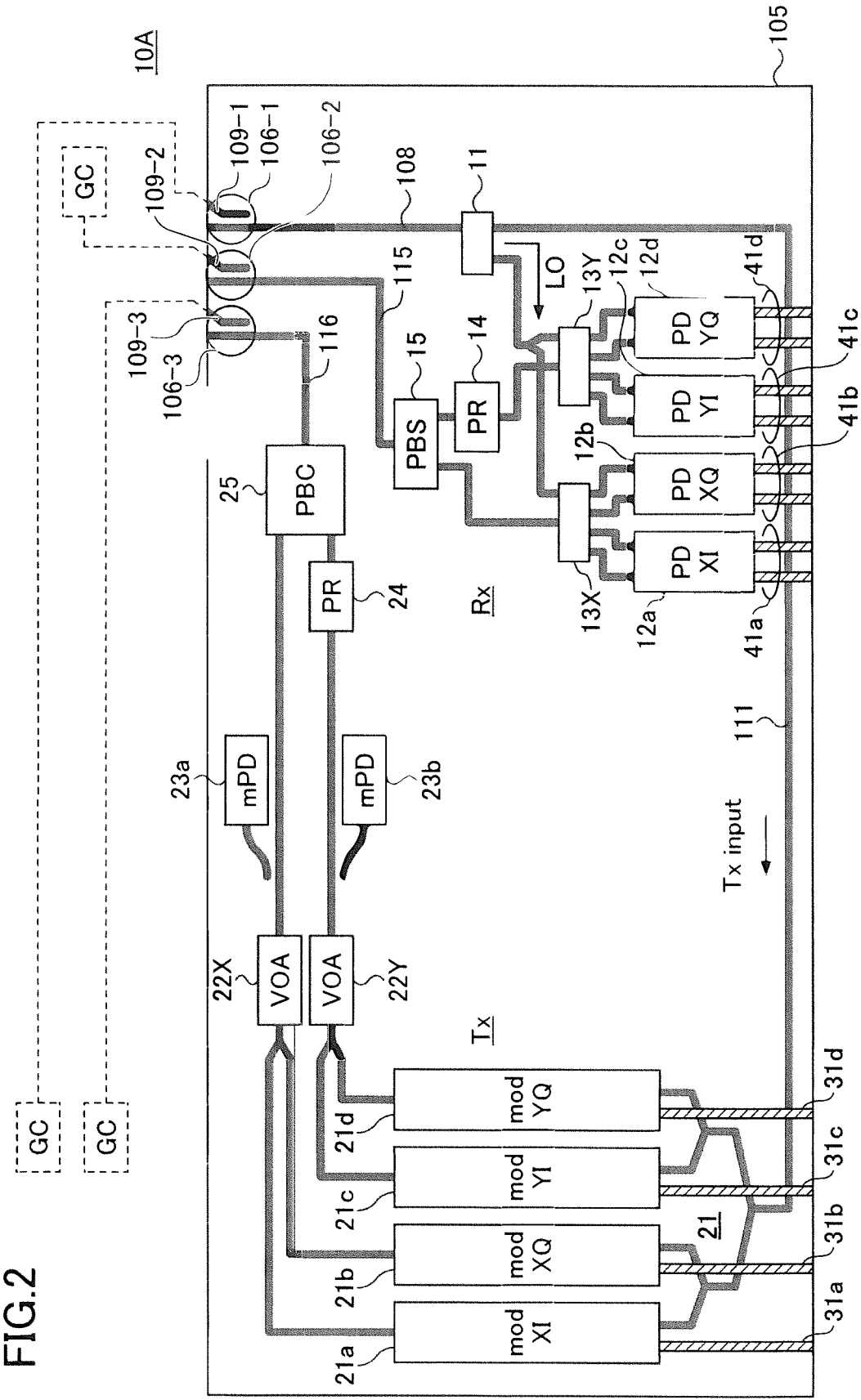
FIG. 2 is a schematic diagram illustrating an optical device acquired after dicing according to the first embodiment.

FIG. 2 is a schematic diagram of an optical device 10A obtained after dicing. The optical device 10A employs a modulation scheme of, for example, dual polarization-quadrature phase shift keying (DP-QPSK) that transmits a QPSK signal representing four logical values by four orthogonal optical phases on two orthogonally polarized light beams. The optical device 10A has an optical transmitter circuit Tx and an optical receiver circuit Rx integrated onto the substrate 105, and works as, for example, a frontend (optical-to-electrical and electrical-to-optical conversion) circuit of an optical transceiver.

The optical device 10A has a directional coupler 106-1 having been used to input a laser beam during wafer-level testing, a directional coupler 106-2 having been used to input a test signal light during wafer-level testing, and a directional coupler 106-3 having been used to output a test signal light during wafer-level testing.

In the directional coupler 106-1, a part of the oblique waveguide 109-1 used for the wafer-level performance test remains adjacent to the optical waveguide 108. In the directional coupler 106-2, a part of the oblique waveguide 109-2 used for the wafer-level performance test remains adjacent to the optical waveguide 115. In the directional coupler 106-3, a part of the oblique waveguide 109-3 used for the wafer-level performance test remains adjacent to the optical waveguide 116.

In operations, a laser beam emitted from a light source is incident on the optical waveguide 108. The laser beam propagating through the optical waveguide 108 is split into two by an optical coupler 11, one part of which is supplied to a modulation block 21 of the optical transceiver circuit Tx, and the other part is used as a local light (LO) or a reference light to detect a signal light received at the optical receiver circuit Rx.

The optical coupler 11 positioned on the optical waveguide 108 or 90-degree hybrid optical mixers 13X and 13Y provided in the optical receiver circuit Rx may become reflection points. However, even if the reflected light returns to the laser beam incident point, at least a part of the reflected light is coupled to the oblique waveguide 109-1 and reflection at the edge is reduced. This configuration can reduce noise mixed into the laser beam to be supplied to the optical transmitter circuit Tx and the optical receiver circuit Rx.

In the optical receiver circuit Rx, an optical signal input to and propagating through the optical waveguide 115 is split into two polarized waves by a polarization beam splitter (PBS) 15. The polarization axis of one of the two polarized waves is rotated by 90 degrees by a polarization rotator (PR) 14, and then the respective waves are input to the 90-degree hybrid optical mixers 13X and 13Y. At the 90-degree hybrid optical mixer 13X, one of the signal components (e.g., X-polarized branch) interferes with the local light LO, and an in-phase (I) component and a quadrature-phase (Q) component whose optical phase is shifted by 90 degrees from the in-phase interfered light are output. At the 90-degree hybrid optical mixer 13Y, the other of the signal components (e.g., Y-polarized branch) interferes with the local light LO, and an in-phase component and a quadrature-phase component whose optical phase is shifted by 90 degrees from the in-phase interfered light are output. The four differential pairs of light signals output from the 90-degree hybrid optical mixers 13X and 13Y are detected at photodetectors 12a (PD-XI), 12b (PD-XQ), 12c (PD-YI), and 12d (PD-YQ). The photocurrents generated by the photodetectors 12a to 12d are output through the four pairs of signal lines 41a, 41b, 41c and 41d.

The polarization beam splitter 15 located on the optical waveguide 115 may become a reflection point; however, even though the reflected light returns to the received signal input end, at least a part of the reflected light is coupled to the oblique waveguide 109-2 and the reflection is reduced. Consequently, undesired resonance can be suppressed.

In the optical transmitter circuit Tx, the laser beam is modulated by the modulation block 21 and a modulated optical signal is generated. The modulation block 21 includes optical modulators 21a (XI), 21b (XQ), 21c (YI), and 21d (YQ). The laser beam split by the optical coupler 11 travels through the optical waveguide 111 and is incident on optical modulators 21a to 21d. High frequency drive signals are applied to the optical modulators 21a to 21d from the signal lines 31a to 31d to modulate the laser beam. A phase difference of n/2 is given between the output lights of the optical modulator 21a and the optical modulator 21b, which are then combined and supplied to the polarization beam combiner (PBC) 25. A phase difference of n/2 is given between the output lights of the optical modulator 21c and the optical modulator 21d, which are then combined; the polarization axis of the combined light is rotated by 90 degrees by a polarization rotator (PR) 24 and then supplied to the polarization beam combiner 25.

The two orthogonally polarized lights are multiplexed by the polarization beam combiner 26. The multiplexed signal light is output from the directional coupler 106-3, which may serve as a transmission port, to an external optical path such as a fiber optic cable. Before the transmission port (for example, before the polarization multiplexing), variable optical attenuators (VOA) 22X and 22Y and monitor photodiodes (mPD) 23a and 23b may be integrated on the substrate 105 in order to control the modulated optical signal levels to the appropriate levels.

Figure 3:
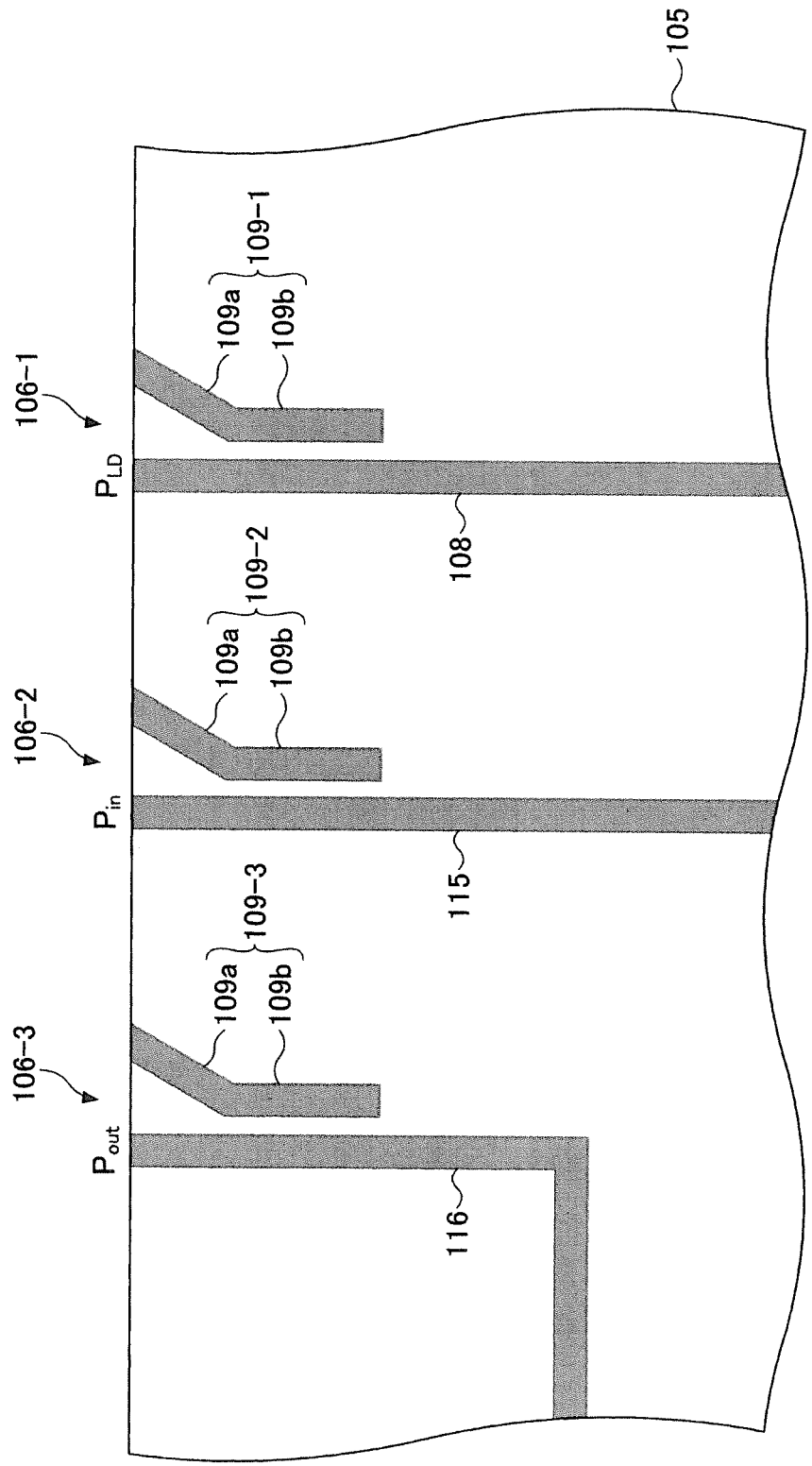
FIG. 3 is an enlarged view of the optical device at the input/output edge of the substrate.

FIG. 3 is an enlarged view of an input/output end of the substrate 105. The directional coupler 106-1 located at the laser beam incident port $P_{LD}$ has the oblique waveguide 109-1 that is optically coupled to the optical waveguide 108. The oblique waveguide 109-1 is an end part of the waveguide used for the wafer-level testing, and it includes an oblique portion 109a obliquely extending with respect to the edge of the substrate 105 and a parallel portion 109b extending parallel to the optical waveguide 108.

The directional coupler 106-1 acts on the light reflected back from a reflection point on the laser beam input path. The interaction length, the gap, and other parameters of the directional coupler 106-1 are appropriated designed such that the test beam from the grating coupler 121 is efficiently coupled to the optical waveguide 108 during the wafer-level testing and that the return light reflected from a reflection point is branched to the oblique waveguide 109-1 during service. Even though light reflection occurs on the laser beam input path, at least a part of the reflected light is coupled to the oblique waveguide 109-1 and undesired resonance is reduced.

The directional coupler 106-2 provided at the optical signal receiving port $P_{in}$ has the oblique waveguide 109-2 that is optically coupled to the optical waveguide 115. The oblique waveguide 109-2 is an end part of the waveguide used for the wafer-level testing, and it includes an oblique portion 109a obliquely extending with respect to the edge of the substrate 105 and a parallel portion 109b extending parallel to the optical waveguide 115.

The directional coupler 106-2 acts on the light reflected back from a reflection point on the optical signal receiving path. The interaction length, the gap, and other parameters of the directional coupler 106-2 are appropriated designed such that the test signal input to the associated grating coupler is efficiently coupled from the oblique waveguide 109-2 to the optical waveguide 115 during the wafer-level testing and that the reflected return light is branched to the oblique waveguide 109-2 during service. Even though light reflection occurs on the optical signal receiving path, at least a part of the reflected light is coupled to the oblique waveguide 109-2 and undesired resonance is reduced.

The directional coupler 106-3 provided at the optical signal transmission port $P_{out}$ has the oblique waveguide 109-3 that is optically coupled to the optical waveguide 116. The oblique waveguide 109-3 is an end part of the waveguide used for the wafer-level testing, and it includes an oblique portion 109a obliquely extending with respect to the edge of the substrate 105 and a parallel portion 109b extending parallel to the optical waveguide 116. Even if light reflection occurs between the end face of the optical waveguide 116 and a reflection point on the optical signal transmission path, at least a part of the reflected light is coupled to the oblique waveguide 109-3 and undesired resonance is reduced. On the transmission side, a portion of an optical signal to be transmitted may be coupled to the oblique waveguide 109-3 during service. However, since noise or undesired resonance is reduced, the quality of the transmitted optical signal is maintained.

In the first embodiment, by connecting the optical circuit within the chip area 101 and grating couplers 121 to 123 provided outside the chip area 101 for wafer-level testing via obliquely extending optical waveguides, undesired noise due to light resonance can be prevented during service.

Figure 4:
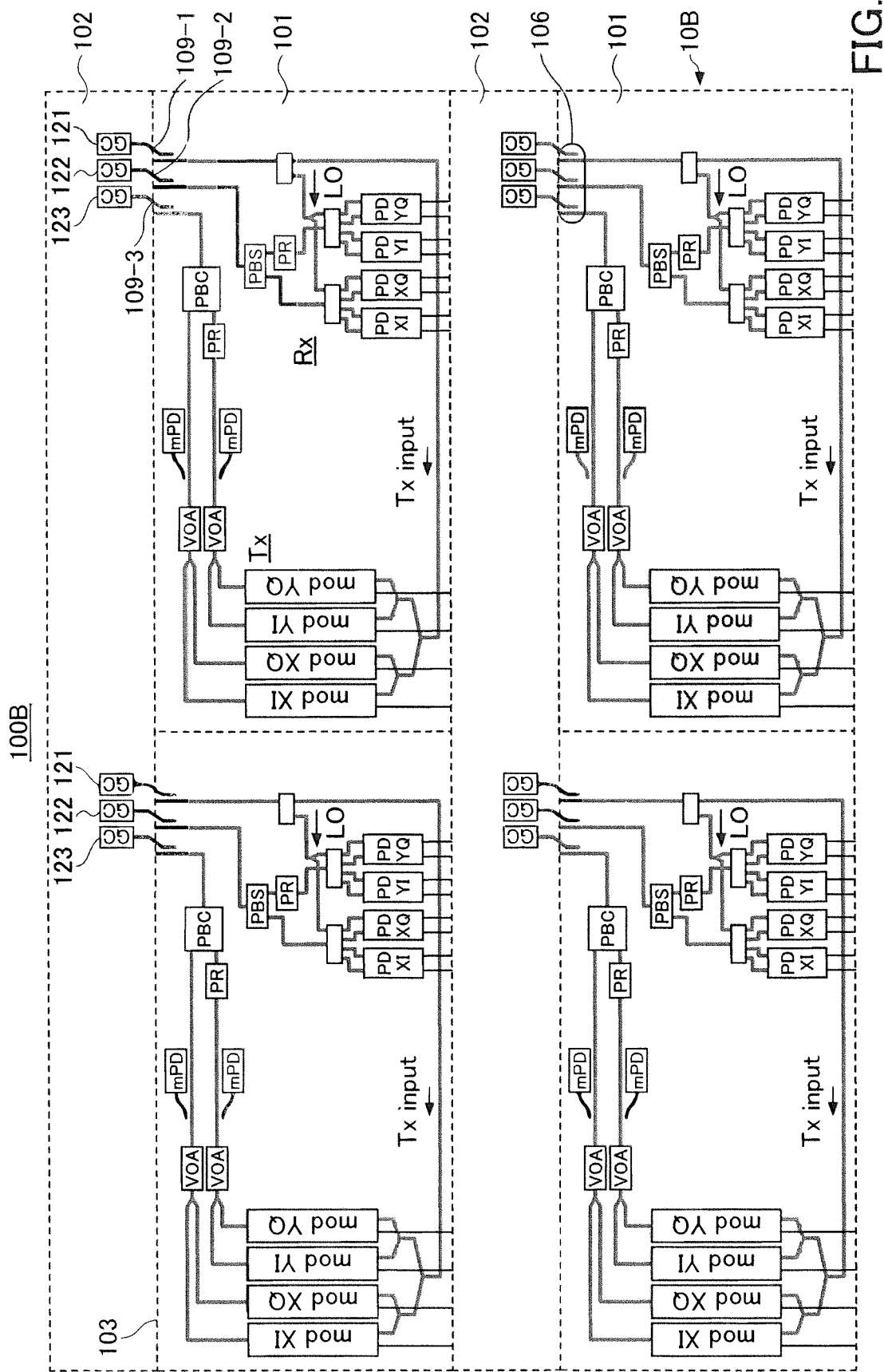
FIG. 4 illustrates a modification of the first embodiment, with another layout design of the grating couplers over the wafer.

FIG. 4 illustrates a modification of the first embodiment, in which the layout design of the grating couplers 121 to 123 on the wafer 100B is modified. In the configuration of FIG. 4, the grating couplers 121 to 123 are provided side by side or in an array in the test light input/output area 102.

In the layout design of FIG. 1, when testing, for example, the optical receiver circuit Rx in the chip area 101, test lights are input to the grating couplers 121 and 122 using two individual optical fibers which are provided at opposite ends along the lengthwise direction of the test light input/output area 102. The optical axes of the respective optical fibers are brought into alignment with the centers of the grating couplers 121 and 122 independently from each other.

In contrast, in the modification of FIG. 4, the grating couplers 121 to 123 are arranged in an array, and adjustment of the optical axes of the optical fibers is facilitated when implementing wafer-level testing. For example, the optical axes of the fiber optics can be adjusted collectively and simultaneously using a fiber array, and light beams can be input to or extracted from multiple grating couplers. Besides, since the layout space of the grating couplers is reduced, the width of the test light input/output area 102 can be reduced on the wafer 100B.

The configuration of an individual optical device 10B obtained after dicing the wafer 100B is the same as the optical device 10A of FIG. 2. The end parts of the oblique waveguides 109-1 to 109-3 used for wafer-level testing remain in the optical device 10B and serve as a part of directional couplers 106-1 to 106-3, thereby reducing undesired resonance due to reflected return light.

Second Embodiment

Figure 5:
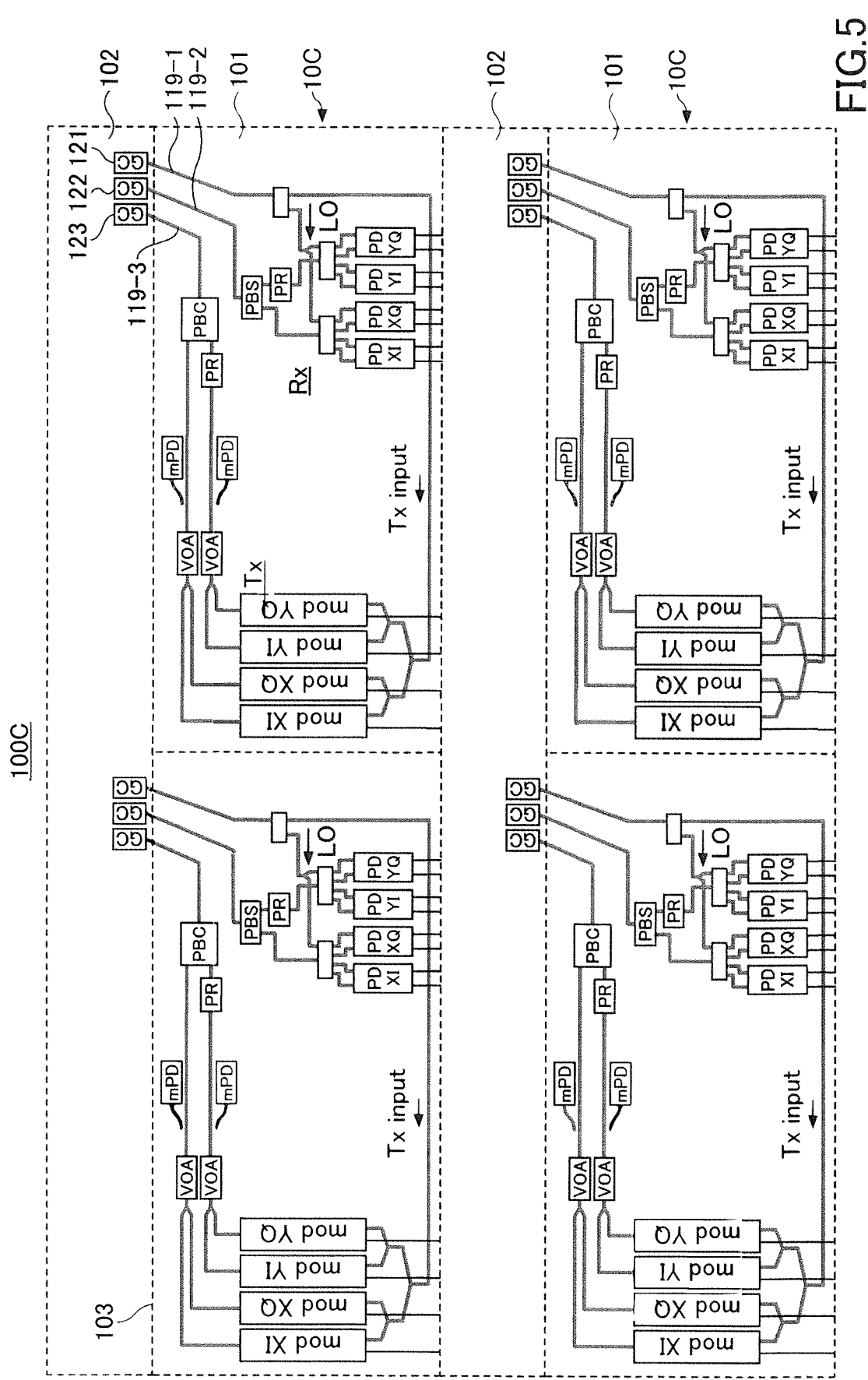
FIG. 5 is a schematic diagram illustrating a plurality of chip areas formed over a wafer according to the second embodiment.

FIG. 5 is a schematic diagram of a plurality of chip areas 101 formed on a wafer 100C. The same components as those of the first embodiment are denoted by the same reference numerals and redundant description will be omitted. In the second embodiment, test light is input to or extracted from an optical device 10C through the oblique waveguides 119-1 to 119-3 without using directional couplers 106. In wafer-level testing, the oblique waveguides 119-1 to 119-3 connect the grating couplers 121 to 123 of the test light input/output area 102 directly to the optical circuit in the chip area 101.

The laser beam is input as a test light from the grating coupler 121 and supplied to the optical transmitter circuit Tx and the optical receiver circuit Rx through the oblique waveguide 119-1. A test signal light is input to the grating coupler 122 and supplied to the optical receiver circuit Rx through the oblique waveguide 119-2. A test signal generated by the optical transmitter circuit Tx travels through the oblique waveguide 119-3 and is output from the grating coupler 123.

The configuration of FIG. 5 can reduce the optical loss that may occur in a directional coupler. In addition, because the grating couplers 121 to 123 and the optical circuits in the chip area 101 are connected by the oblique waveguides 119-1 to 119-3, noise due to reflected return light can be reduced during service of individual chips.

Figure 6:
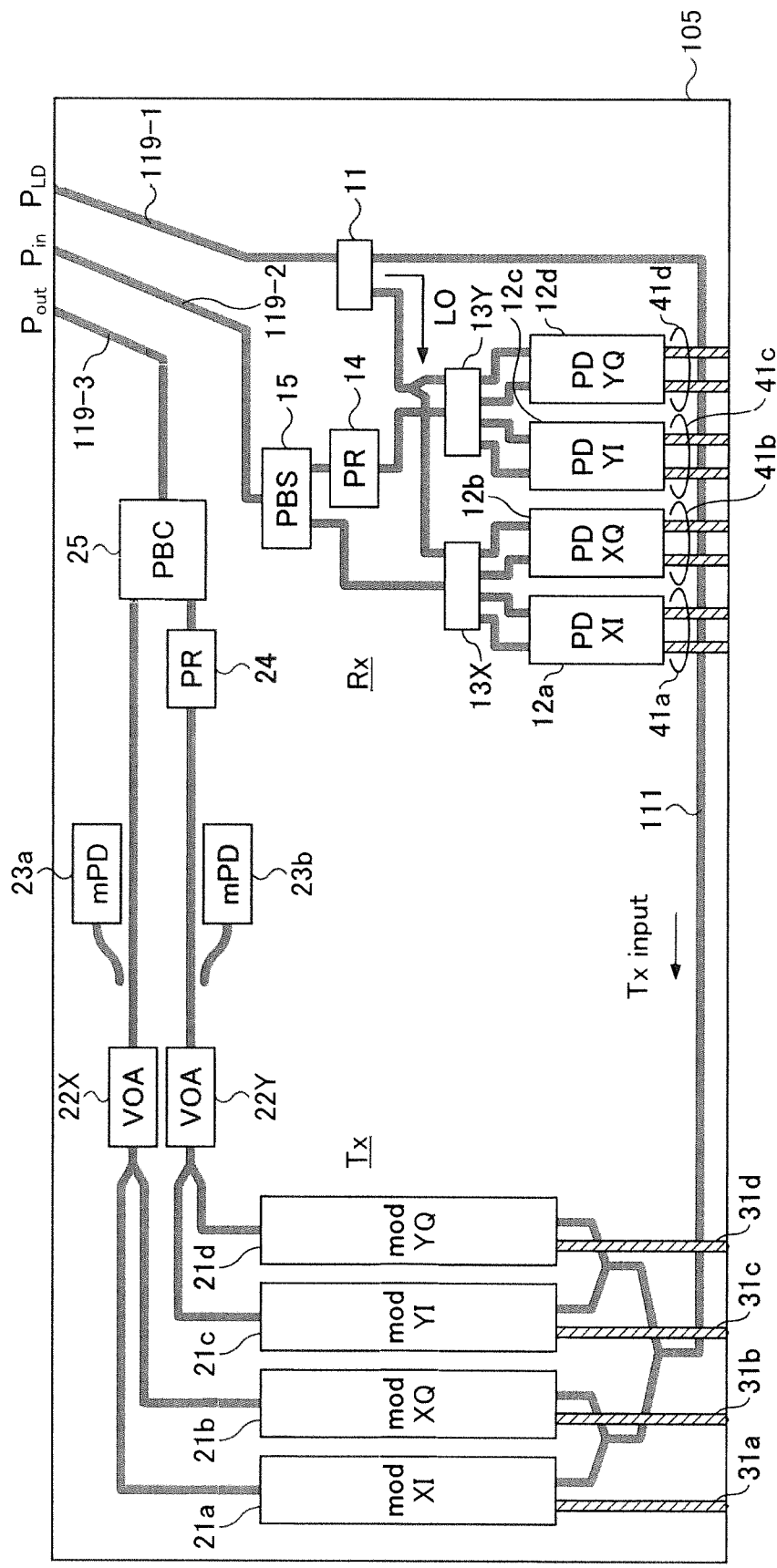
FIG. 6 is a schematic diagram illustrating an optical device acquired after dicing according to the second embodiment.

FIG. 6 is a schematic diagram of an optical device 10C obtained after dicing of the wafer 100C. The optical device 10C includes an oblique waveguide 119-1 extending from the laser beam incident port $P_{LD}$ obliquely with respect to an edge of the substrate, an oblique waveguide 119-2 extending from the optical signal receiving port $P_{in}$ obliquely with respect to the edge of the substrate, and an oblique waveguide 119-3 extending from the optical signal transmission port $P_{out}$ obliquely with respect to the edge of the substrate.

In operations, a laser beam is input to the oblique waveguide 119-1 through the laser beam incident port $P_{LD}$. The laser beam travelling through the oblique waveguide 119-1 is branched by the optical coupler 11 into two, one of which is supplied to the modulation block 21 of the optical transmitter circuit Tx, and the other is supplied as a local light (LO) to the optical receiver circuit Rx for detection of signal light.

The optical coupler 11 and the 90-degree hybrid optical mixers 13X and 13Y in the optical receiver circuit Rx may be reflection points. However, even though the reflected light returns back to the laser beam incident port $P_{LD}$, reflection at the edge of the substrate can be reduced. Consequently, the amount of noise that could be mixed into the laser beam supplied to the optical transmitter circuit Tx and the optical receiver circuit Rx is reduced, and the deterioration of the optical signal is prevented.

The received optical signal input from the optical signal receiving port $P_{in}$ to the oblique waveguide 119-2 is converted into photocurrents representing four logical values having been carried on each of the orthogonally polarized waves, by the optical receiver circuit Rx. The photocurrents are output from the four pairs of signal lines 41a to 41d. Even though a reflected return light from a reflection point on the receiving path exists, re-reflection at the edge of the substrate 105 can be reduced owing to the oblique waveguide 119-2. Occurrence of undesired resonance is suppressed.

An optical signal generated by the optical transmitter circuit Tx is supplied through the oblique waveguide 119-3 to and output from the optical signal transmission port $P_{out}$. Because of the oblique waveguide 119-3 that extends obliquely with respect to the edge of the substrate 105, reflection at the edge is reduced and undesired resonance between the output edge and a reflection point located on the transmission path can be suppressed.

Since no directional couplers are provided at or near the optical ports, optical loss can be reduced.

Third Embodiment

Figure 7:
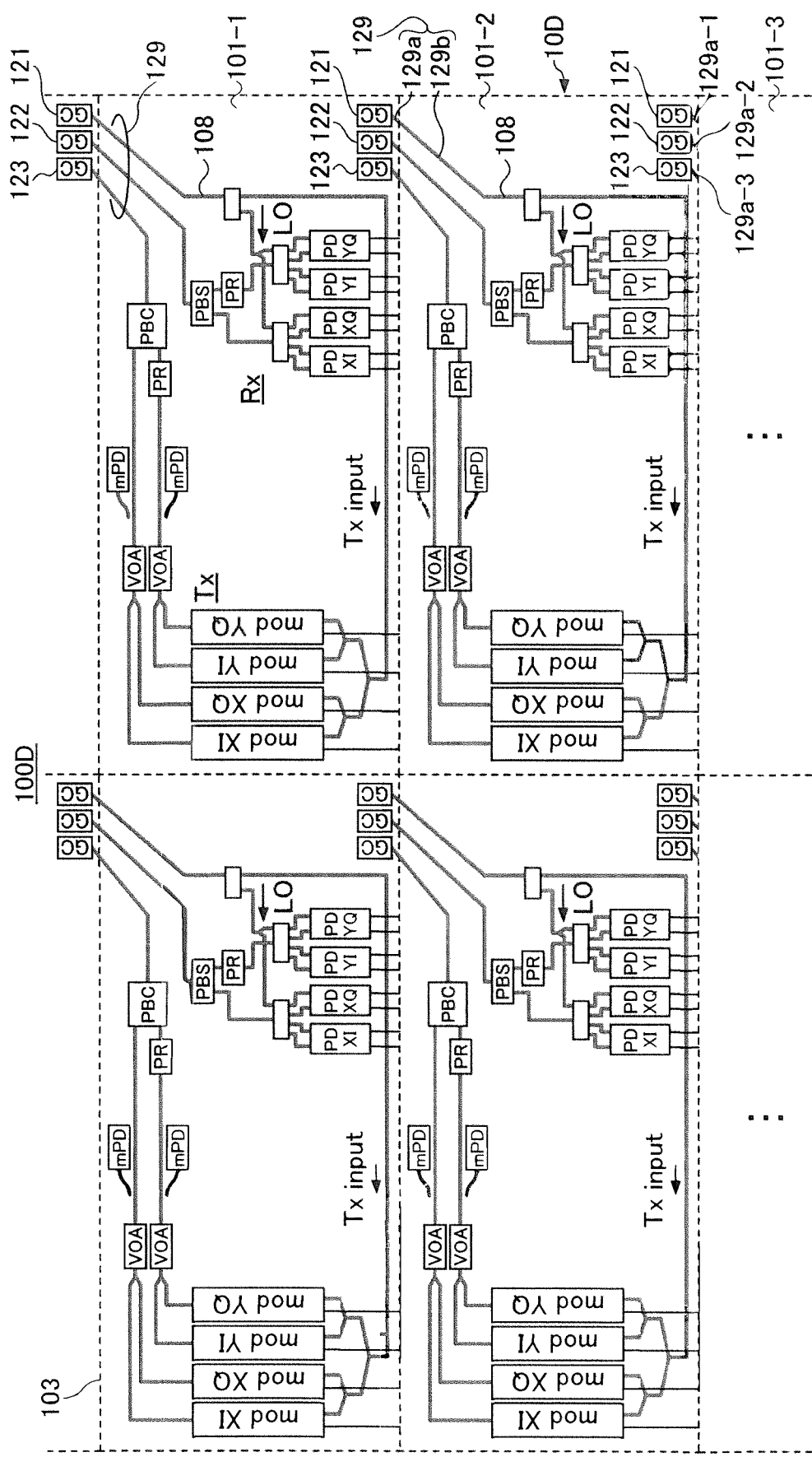
FIG. 7 is a schematic diagram illustrating a plurality of chip areas formed over a wafer according to the third embodiment.

FIG. 7 is a schematic diagram of a plurality of chip areas 101 formed on the wafer 100D. The same components as those of the first embodiment are denoted by the same reference numerals and redundant description will be omitted.

In the first and second embodiments, the grating couplers 121 to 123 are provided in the test light input/output area 102 adjacent to chip areas 101. In such a layout, the number of chips per wafer may decrease.

In the third embodiment, grating couplers for wafer-level testing are formed in a chip area without providing a test light input/output area on a wafer. The grating couplers provided in a chip area are used to evaluate the optical and opto-electrical performances of the adjacent chip area on the wafer.

The grating couplers 121 to 123 formed in the chip area 101-1 are connected to the optical transmitter circuit Tx and the optical receiver circuit Rx in the adjacent chip area 101-2 by oblique waveguides 129 extending obliquely with respect to the scribe line 103. The oblique waveguides 129 have first portions 129a remaining in the chip area 101-1 together with the grating couplers 121 to 123 after dicing and second portions 129*b* that are to be optically connected to the input/output ports of the chip defined by the chip area 101-2.

The grating couplers 121 to 123 are provided near the edge of the chip area 101-1 so as not to disturb the circuit configuration of the chip area 101-1, while minimizing the distance to the adjacent chip area 101-2. The grating couplers 121 to 123 may be positioned at equal intervals. The layout at the equal intervals allows the adjustment of the optical axes of the fiber optics to be carried out just once using a fiber array when conducting wafer-level testing.

Figure 8:
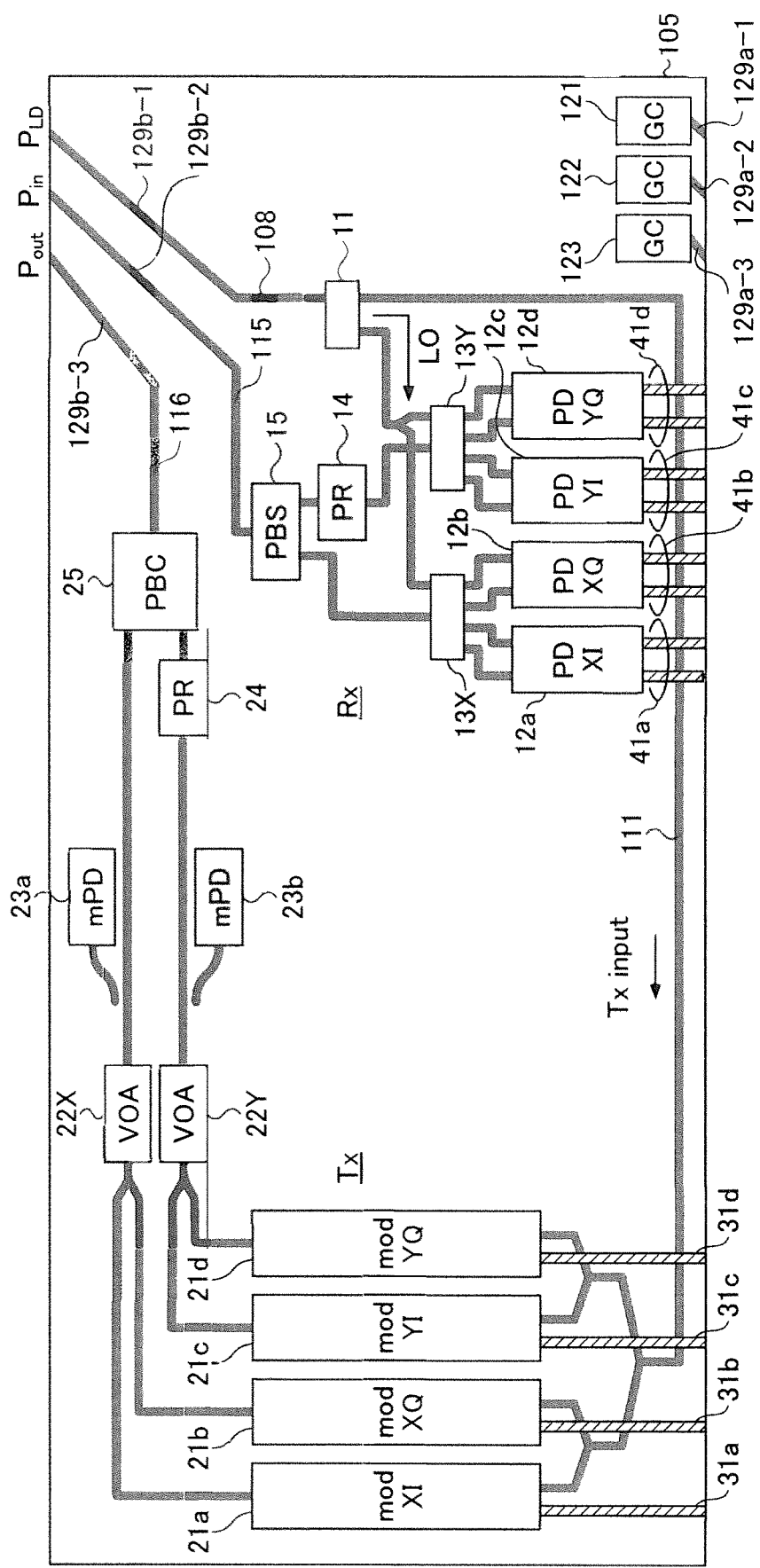
FIG. 8 is a schematic diagram illustrating an optical device acquired after dicing according to the second embodiment.

FIG. 8 is a schematic diagram of an optical device 10D obtained after dicing of the wafer 100D. Similar to the optical device 10C of FIG. 6, the optical device 10D has an oblique waveguide 129*b*-1 extending obliquely with respect to a substrate edge from the laser beam incident port $P_{LD}$, an oblique waveguide 129*b*-2 extending obliquely with respect to the substrate edge from the optical signal receiving port $P_{in}$, and an oblique waveguide 129*b*-3 extending obliquely with respect to the substrate edge from the optical signal transmission port $P_{out}$.

The optical device 10D also has grating couplers 121 to 123 provided on the substrate 105 at equal intervals. The first portions 129*a*-1, 129*a*-2 and 129*a*-3 of the oblique waveguides extend from the grating couplers 121, 122 and 123, respectively, with respect to another edge of the substrate 105. The grating couplers 121 to 123 are optically isolated from both the optical transmitter circuit Tx and the optical receiver circuit Rx.

With the configuration of the third embodiment, it is unnecessary to provide an extra area for providing grating couplers for performance tests on a wafer, and the number of chips per wafer can be increased. By providing the grating couplers at equal intervals, the optical axes of fiber optics can be adjusted collectively and simultaneously using an optical fiber array when performing wafer-level testing.

Fourth Embodiment

Figure 9:
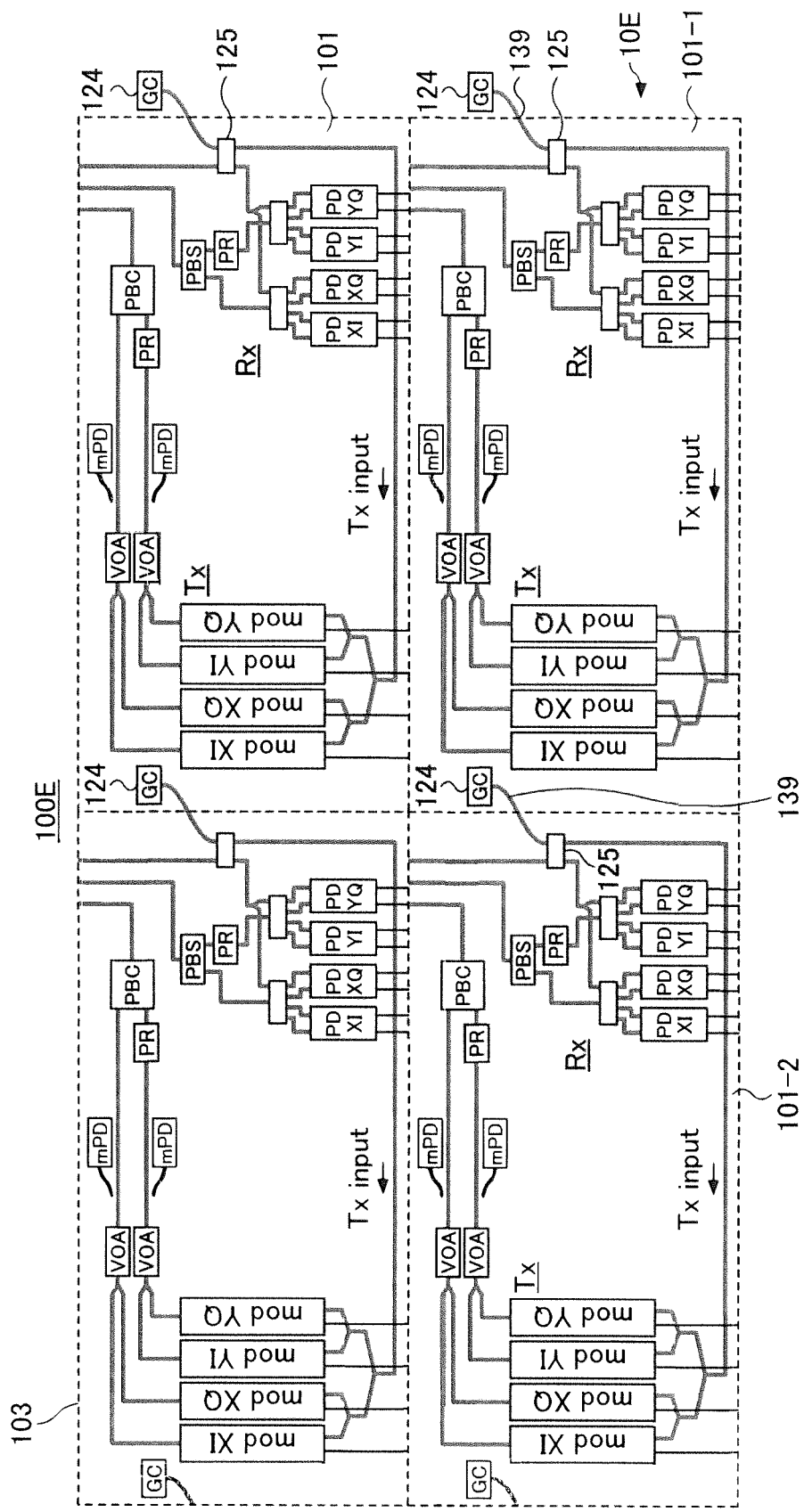
FIG. 9 is a schematic diagram illustrating a plurality of chip areas formed over a wafer according to the fourth embodiment.

FIG. 9 is a schematic diagram of a plurality of chip areas 101 formed on the wafer 100E. The same components as those of the first embodiment are denoted by the same reference numerals and redundant description will be omitted.

Depending on the configuration of the optical circuit of the optical device 10, there might, in some cases, be a situation where light cannot be input to or extracted from the laser beam incident port $P_{LD}$, the optical signal receiving port $P_{in}$, or the optical signal transmission port $P_{out}$. In such a case, a 2×2 (2-input 2-output) optical coupler 125 having an oblique waveguide may be used to supply a test light to the optical transmitter circuit Tx and the optical receiver circuit Rx, as illustrated in FIG. 9.

The test light for the chip area 101-2 is input from the grating coupler 124 provided in the chip area 101-1, bringing the end face of an optical fiber to face the grating coupler 124 at a predetermined angle. In the example of FIG. 9, the grating coupler 124 formed in the chip area 101-1 is connected to the 2×2 optical coupler 125 of the adjacent chip area 101-2 using an oblique waveguide 139 across the scribe line 103. One of the two output ports of the 2×2 optical coupler 125 is connected to the optical transmitter circuit Tx, and the other output port is connected to the optical receiving circuit Rx.

Figure 10:
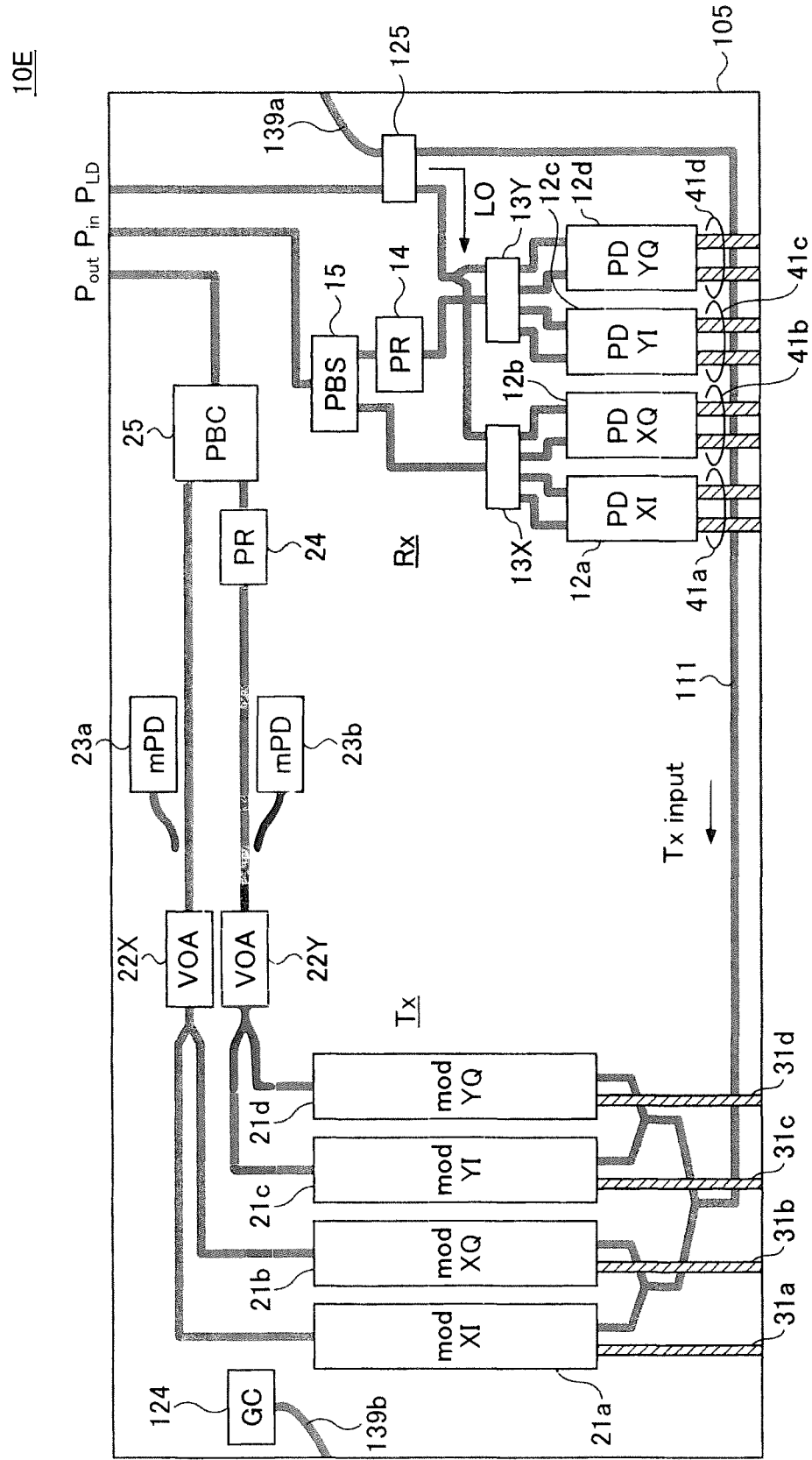
FIG. 10 is a schematic diagram illustrating an optical device acquired after dicing according to the fourth embodiment.

FIG. 10 is a schematic diagram of an optical device 10E obtained after dicing the wafer 100E. The optical device 10E has a 2×2 optical coupler 125 optically connected to the laser beam incident port $P_{LD}$. One of the two input ports of the 2×2 optical coupler 125 is connected to the laser beam incident port $P_{LD}$, and the other input port extends as a waveguide 139*a* obliquely toward an edge of the substrate 105. The waveguide 139*a* is a part of the oblique waveguide 139 provided on the wafer 100E.

The optical device 10E also has a grating coupler 124 and a waveguide 139*b* extending from the grating coupler 124 obliquely toward an edge opposite to the 2×2 optical coupler 125. The waveguide 139*b* is a part of the oblique waveguide 139 provided on the wafer 100E.

In wafer-level testing on the wafer 100E, light is input from the grating coupler 124 of the adjacent chip area to the 2×2 optical coupler 125, and one of the light portions branched by the 2×2 optical coupler 125 is supplied through the optical waveguide 111 to the optical modulators 21*a* to 21*d*. The light incident on the optical modulators 21*a* to 21*d* is modulated by test drive signals input from the signal lines 31*a* to 31*d*, and output from the light modulators 21*a* to 21*d*. The characteristics of the optical transmitter circuit Tx are inspected by detecting the current signals output from the monitor PDs 23*a* and 23*b*.

In operations of the optical device 10E, light is input to the 2×2 optical coupler 125 from the laser beam incident port $P_{LD}$. One of the light portions branched by the 2×2 optical coupler 125 is modulated by the optical transmitter circuit Tx, and the modulated optical signal is output from the optical signal transmission port $P_{out}$. The other of the light portions branched by the 2×2 optical coupler 125 is supplied as a local light (LO) to the optical receiver circuit Rx to detect a received optical signal input from the optical signal receiving port $P_{in}$.

During service, the 2×2 optical coupler 125 or the 90-degree hybrid optical mixers 13X and 13Y of the optical receiver circuit Rx may become a reflection point for the light beam incident from a light source. However, even though a reflected light returns along the path, re-reflection at the edge of the substrate 105 is suppressed because of the obliquely provided waveguide 139*a*. Undesired light resonance and the resultant noise can be reduced. Even when it is difficult to input or extract a test light to or from the light input/output ports in the wafer state, performances of the optical device can be tested over the wafer.

<Applications to Optical Communication Module>

Figure 11:
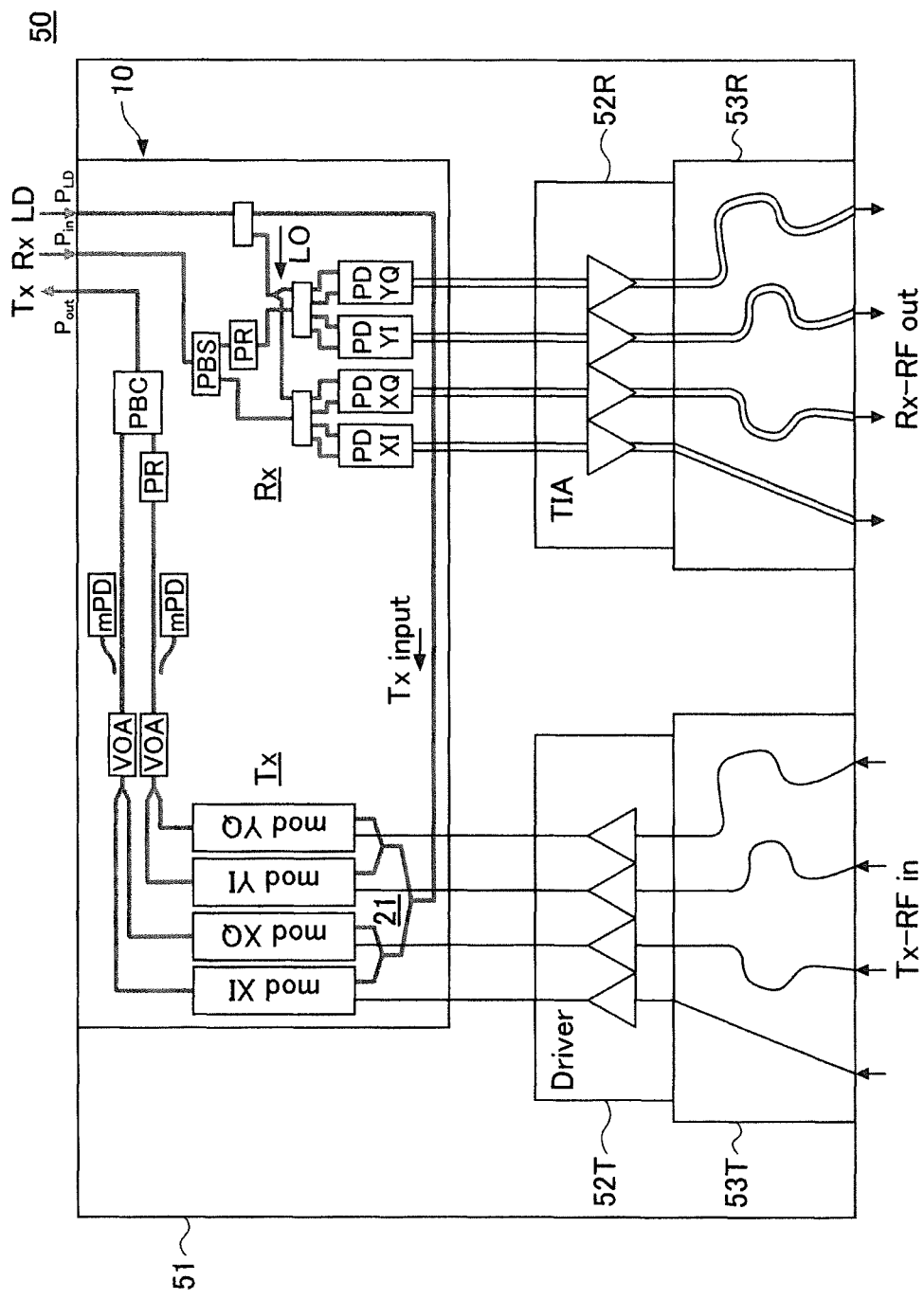
FIG. 11 illustrates a configuration example of an optical module for optical-to-electrical and electrical-to-optical conversion.

FIG. 11 illustrates an application of any one of the optical devices 10A to 10E (referred to collectively as "optical device 10"). The optical device 10 may be housed together with an electric circuit chip in a package to produce an optical transmitter/receiving frontend package 50 for use in optical-to-electric and electric-to-optical conversion.

The optical transmitter/receiver frontend package 50 has, in a package 51, an optical device 10 which is a photonic integrated circuit chip, a driver circuit 52T, a transimpedance amplifier (TIA) circuit 52R, and interposer boards 53T and 53R. When a data signal is input through the interposer board 53T to the driver circuit 52T, the driver circuit 52T generates a high-frequency drive signal based upon the data signal, and applies the drive signal to the optical transmitter circuit Tx of the optical device 10. The modulation block 21 of the optical transmitter circuit Tx modulates the laser beam (LD) input to the optical device 10 with the high-frequency drive signal, and outputs the modulated light to the optical signal transmission port $P_{out}$.

An optical signal input from the optical signal receiving port $P_{in}$ of the optical device 10 is detected at the optical receiver circuit Rx, and a set of photocurrents (e.g., a set of differential currents) are input to the TIA circuit 52R. The TIA circuit 52R converts the photocurrents into voltage signals, which are then output through the interposer board 53R.

The optical device 10 used in the optical transmitter/receiver frontend package 50 has already been tested over a wafer for its transmission and reception characteristics, and light resonance between input/output ports and a reflection point on a transmission path is suppressed. Accordingly, a compact and high performance optical module is realized.

Figure 12:
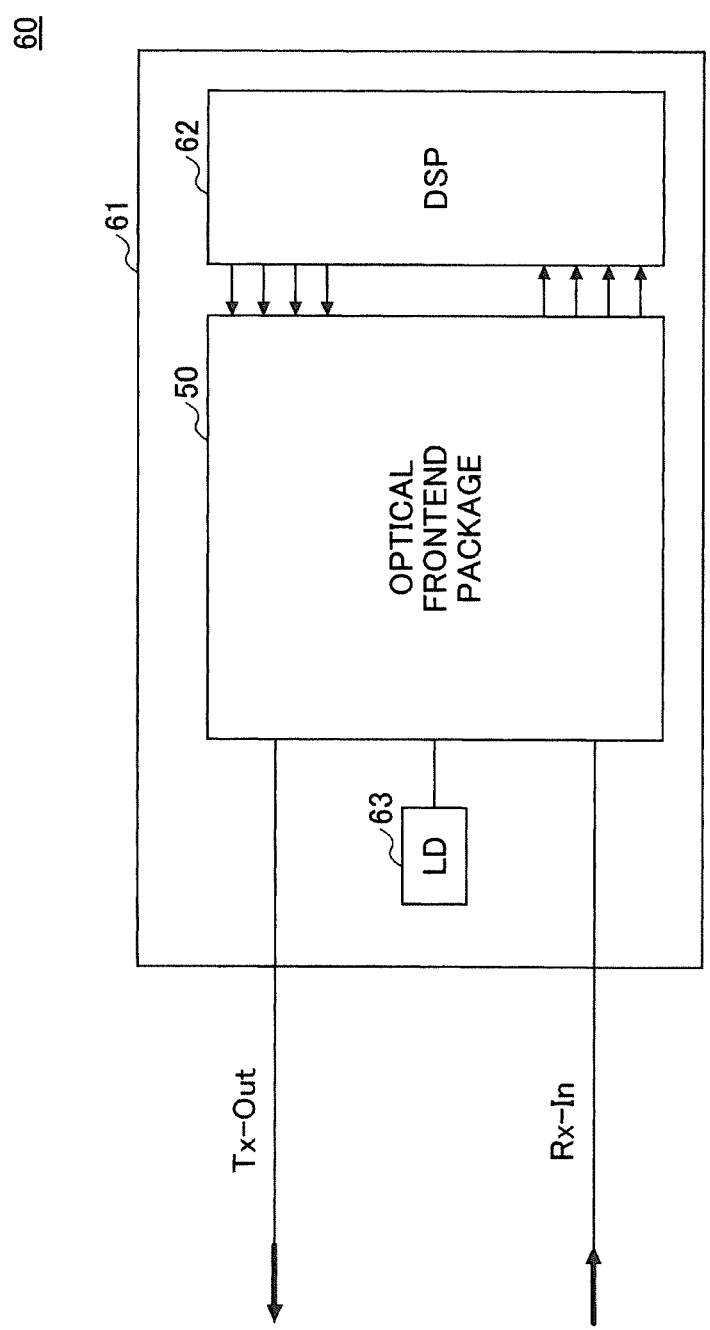
FIG. 12 illustrates an example of the configuration of an optical transceiver using the optical transmitter/receiver package of FIG. 11.

FIG. 12 is a schematic diagram of an optical transceiver module 60 using the optical transmitter/receiver frontend package 50 of FIG. 11. The optical transceiver module 60 includes the optical transmitter/receiver frontend package 50, a light source unit (labelled as "LD" in the FIG. 63 and a digital signal processor (DSP) 62, which are accommodated in a package 61.

In the optical transceiver module 60, undesired resonance and the resultant noise are reduced at the transmitter/receiver frontend circuit that works as optical-to-electric and electric-to-optical converters. Accordingly, the optical transceiver module 60 has satisfactory light transmission and reception characteristics.

The embodiments described above are examples and various modifications and alternatives are included in the invention. The modulation block 21 of the optical device 10 is not limited to a DP-QPSK scheme, but is also applicable to 16-QAM, QPSK, and other modulation schemes in which multiple signal paths or channels are formed by optical waveguides. The optical transceiver module 60 of the embodiment is suitably applied to short distance optical communications such as one between servers in a data center, as well as to optical communications between data centers and optical communications in metropolitan area networks.

The optical coupler that inputs and outputs test light in and from wafer-state chip areas is not limited to the grating coupler, and any components that allow light to be input to and extracted from in a direction perpendicular or oblique to the wafer surface can be used. For example, a photonic crystal with a periodic change in the index of refraction, a mirror, or other optical systems may be used.

In the fourth embodiment (in connection with FIG. 9 and FIG. 10), a directional coupler may be used in place of the 2×2 optical coupler 125 for branching the input light toward the optical transmitter circuit Tx and the optical receiver circuit Rx.

Two or more of the first to third embodiments may be combined with each other. For example, on the wafer, at least one of the laser beam incident port and the optical signal receiving port may be connected to the corresponding grating coupler(s) located in the adjacent area via a directional coupler, and the optical signal transmission port may be connected directly to the corresponding grating coupler located in the adjacent area by an oblique waveguide. In the configuration of FIG. 10, when there is a space in the chip area for arranging an additional grating coupler, other than the grating coupler 124, the additional grating coupler may be coupled to the optical signal receiving port $P_{in}$ of an adjacent chip area. After dicing, the grating couplers used for the wafer-level testing and remaining on an individual chip are optically isolated from the optical circuit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority or inferiority of the invention. Although the embodiments of the present inventions have been described in detail, it should be understood that the various changes, substitutions, and alterations could be made hereto without departing from the spirit and scope of the invention.

What is claimed is:

1. An optical device with an optical transmitter circuit and an optical receiver circuit integrated on a substrate, comprising at least one of:
   a first oblique waveguide extending obliquely with respect to an edge of the substrate at or near an incident port for introducing a light emitted from a light source to the optical device;
   a second oblique waveguide extending obliquely with respect to the edge of the substrate at or near a signal receiving port optically connected to the optical receiver circuit; and
   a third oblique waveguide extending obliquely with respect to the edge of the substrate at or near a signal transmission port optically connected to the optical transmitter circuit.

2. The optical device as claimed in claim 1, wherein at least one of the first oblique waveguide, the second oblique waveguide, and the third oblique waveguide is optically coupled to an optical waveguide extending perpendicularly to the edge of the substrate and forms a directional coupler.

3. The optical device as claimed in claim 1, further comprising:
   one or more optical couplers provided on a surface of the substrate and configured to input light to or extract light from the surface of the substrate with respect to a direction above the substrate; and
   a fourth oblique waveguide extending from the optical coupler to a second edge opposite to the edge of the substrate,
   wherein the optical coupler and the fourth oblique waveguide are optically isolated from the optical transmitter circuit and the optical receiver circuit.

4. The optical device as claimed in claim 3, wherein the one or more optical couplers are provided on the substrate at equal intervals.

5. An optical device with an optical transmitter circuit and an optical receiver circuit integrated on a substrate, comprising:
   a 2-input 2-output optical coupler optically coupled to an incident port for introducing light emitted from a light source into the optical device and configured to supply the light to the optical transmitter circuit and the optical receiver circuit,
   wherein one of two input terminals of the 2-input 2-output optical coupler is connected to the incident port, and the other of the two input terminals is an oblique waveguide extending obliquely to an edge of the substrate.

6. The optical device as claimed in claim 5, further comprising:
   an optical coupler provided on a surface of the substrate and configured to introduce light from above the substrate,
   wherein the optical coupler is optically isolated from the optical transmitter circuit and the optical receiver circuit.

7. The optical device as claimed in claim 6, further comprising:
   a second oblique waveguide extending from the optical coupler to a second edge opposite to the edge of the substrate.

8. An optical module comprising:
the optical device as claimed in claim 1; and
an electric circuit chip accommodated together with the optical device in a package.

9. An optical module comprising:
the optical device as claimed in claim 5; and
an electric circuit chip accommodated together with the optical device in a package.

* * * * *